Dec. 8, 1964   G. K. NEWELL   3,160,241
VARIABLE LOAD BRAKE APPARATUS
Filed Feb. 26, 1963
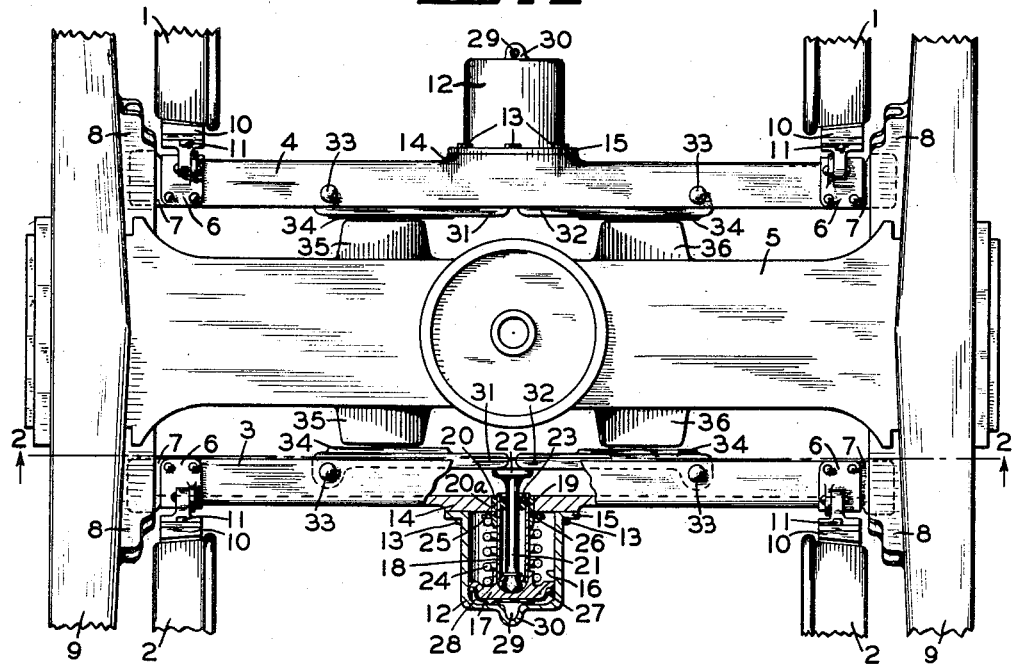
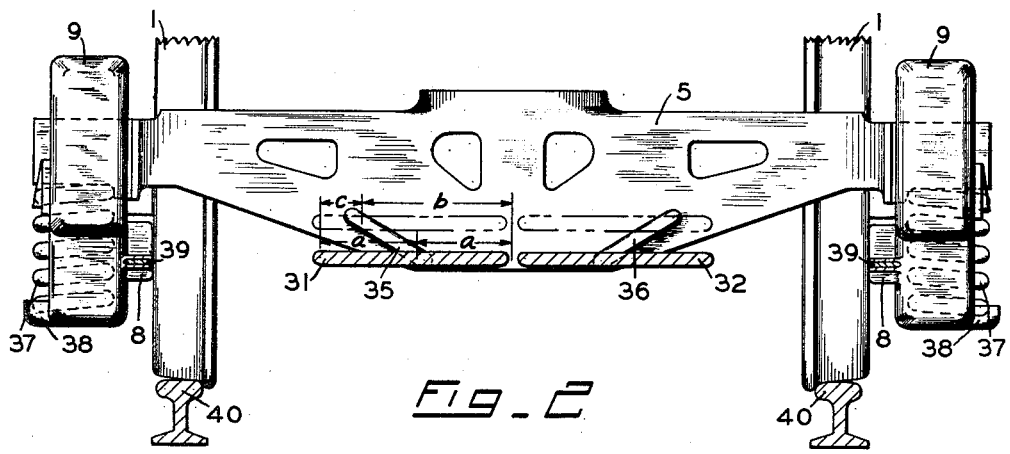
INVENTOR.
GEORGE K. NEWELL
BY
*A. A. Steinmiller*
ATTORNEY 3,160,241
VARIABLE LOAD BRAKE APPARATUS
George K. Newell, Level Green, Penn Township, Westmoreland County, Pa., assignor to Westinghouse Air Brake Company, Wilmerding, Pa., a corporation of Pennsylvania
Filed Feb. 26, 1963, Ser. No. 261,111
14 Claims. (Cl. 188—195)

This invention relates to brake rigging for railway rolling stock and particularly to railway car truck brake riggings of the recently proposed type in which brake cylinders are carried directly on the brake beams and by reaction between the beams, or with the truck bolster, move the beams to produce a brake application on the wheels of the car truck.

Heretofore proposed brake riggings of the type having brake cylinders mounted on brake beams provide uniform braking forces for given brake cylinder pressures regardless of the load carried by the car.

Under certain circumstances where the load carried by a car varies over a wide range, it is desirable to provide some adjustment or variation of braking force to provide adequate and safe braking. This has been accomplished heretofore in connection with older standard type railway car brake riggings by automatic adjustment of the fluid pressure supplied to the brake cylinders dependent upon the load carried by the car as measured by the sprung height of the car body.

It is the purpose of this invention to provide a novel brake rigging of the type having the brake cylinders carried on the brake beams wherein the variation in the sprung height of a car body automatically adjusts the leverage ratios in the brake rigging so that variable braking is produced responsive to a given brake cylinder pressure.

More specifically, this invention comprises a brake rigging in which each of two parallel brake beam carry a brake cylinder that is located at the center of the corresponding beam and has a piston which transmits force through the usual brake cylinder hollow rod and push rod to the adjacent ends of two levers of equal length the opposite ends of which are pivotally connected to the corresponding brake beam at opposite sides of the respective brake cylinder carried thereon. A car bolster disposed between the two parallel brake beams is provided on each side thereof with two lever fulcrums each of which is inclined at an angle to vertical and in a direction opposite that of the other, each being so disposed as to be intermediate the ends of a corresponding lever carried by that brake beam on the same side of the bolster. Raising and lowering of the sprung height of the car truck bolster thus automatically varies the leverage ratio of the brake beam carried levers upon pressurization of the brake cylinders to provide variable load control of braking.

In the accompanying drawing:
FIG. 1 is a plan view, partially in section, of a brake rigging for a four-wheel (that is, two-axle) car truck, which rigging embodies the invention.
FIG. 2 is a cross-sectional view taken on the line 2—2 of FIG. 1, looking in the direction of the arrows and illustrating how the position of each of a pair of brake applying levers carried by a brake beam is varied or changed with respect to its corresponding lever fulcrum which is carried by a car bolster accordingly as the car is empty or fully loaded.

DESCRIPTION

Referring to FIG. 1 of the drawing, the reference numerals 1 and 2 designate respectively the wheels secured at opposite ends of each of two axles of a two-axle four-wheel railway car truck.

The brake rigging shown in FIG. 1 comprises a pair of cast brake beams 3 and 4 extending crosswise of the car truck and in parallel spaced relation to each other and to a truck bolster 5. The brake beams 3 and 4 are symmetrically arranged on opposite sides of the truck bolster 5 and are movably supported at each end on the side frame members of the truck in the manner hereinafter described.

The brake beams 3 and 4 each have generally the shape of a standard channel, illustrated as a U-channel.

A two-part brake head 6 is riveted or otherwise attached to each end of each of the brake beams 3 and 4 adjacent to and on the inboard side of a guide foot 7. Each foot 7 is a flat L-shaped metal member, one leg of which extends between the flanges of the brake beam and is suitably secured thereto. The other leg of each guide foot 7 is slidably supported in a grooved wear plate and guide member 8, said wear plate and guide member being secured to a truck side frame 9. The wear plate and guide members and guide feet serve to support the brake beams 3 and 4 at the proper height above the rails, that is, somewhat below the horizontal diameter of the wheels, the groove in the wear plate and guide member 8 being at a slight angle to the horizontal diameter to permit upward bodily movement of said brake beams in a direction radially of the associated wheels when a brake application is made.

Each brake head 6 carries a composition brake shoe 10 for contact with the tread of an associated wheel. In customary manner, the shoe has a backing plate provided with a key bridge to receive a key 11 for removably locking the shoe to the brake head 6.

The brake shoes 10 are operated into and out of contact with their associated wheels 1 and 2 by means of a fluid pressure motor or brake cylinder 12, one of which is secured as by a plurality of cap screws 13 to a boss 14 that is cast integral with the web of each of the respective U-shaped cast brake beams 3 and 4 and serves as a non-pressure head for the corresponding brake cylinder, the cap screws 13 extending through a plurality of circumferentially spaced holes in an external radial flange 15 formed integral with each brake cylinder 13 and having screw threaded engagement with correspondingly arranged threaded counterbores in the boss 14.

The two brake cylinders 12 are identical in construction, therefore, a description of one will be sufficient for both.

The body of the brake cylinder 12 has a bore 16 in which a piston 17 is slidably operable. A hollow rod 18 secured coaxially to the piston 17 extends through a central opening or bore 19 in a bushing 20 that is pressfitted into a bore 20a in the boss 14 and is adapted to receive one end of a push rod 21, the opposite end of which is provided with a button or head 22.

Disposed in surrounding relation to the push rod 21 and within the upper end of the hollow rod 18, as viewed in FIG. 1, is a hollow piston rod seal 23 that is constructed of some resilient material such as rubber so that when it is pushed into the upper end of the hollow rod 18, it is compressed such that it grips the periphery of the push rod 21 and also exerts a radial outward force or thrust on the interior wall surface of the hollow rod 18, thereby connecting the push rod 21 to the hollow rod 18 to insure that these members are moved together to a brake release position, in which position they are shown in FIG. 1, by a spring 24 that is interposed between the piston 17 and a spring seat 25 that has a resilient hollow rod packing seal 26 disposed between itself and the boss 14.

Formed on a packing cup 27 secured to the piston 17 are a plurality of lugs which, when the piston 17 occupies the position in which it is shown in FIG. 1, contact the end wall or pressure head of the cylinder 12 to form between the piston and the closed end of the cylinder a pressure chamber 28 to which fluid under pressure may be supplied through a passageway 29 formed in a rib 30 extending outwardly from the outside of and formed on the pressure head of the cylinder. The outer end of the passageway 29 is screw threaded to receive one end of a nipple or short piece of pipe (not shown), the opposite end of which is connected by a flexible hose (not shown) to the brake cylinder pipe leading from the usual brake controlling valve device of the air brake system on railway freight cars. Fluid under pressure supplied to pressure chamber 28 through passageway 29 causes movement of the brake cylinder 12 and the respective brake beam to which it is secured in one direction and the piston 17 and push rod 21 in the opposite direction, as hereinafter described in detail, to effect braking contact of the brake shoes 10 carried by the respective brake beam with the tread of the respectively associated wheels.

The head 22 on the end of each push rod 21 abuts the adjacent ends of two identical and oppositely extending levers 31 and 32. The opposite end of each of the levers 31 and 32 is provided with a boss that is disposed between the upper and lower flanges of the respective cast brake beam, illustrated as hereinbefore stated as having generally the shape of a U-channel, and is pivotally connected to the respective brake beam as by a pin 33 that passes through a hole in the boss and corresponding holes in the upper and lower flanges of the brake beam.

In order to provide a wear resistant surface on that side of each of the levers 31 and 32 that is adjacent the bolsters 5, for a reason hereinafter made more apparent, this side of each of these levers has secured thereto, intermediate its ends as by welding, a pad 34 constructed of some suitable material having a wear resistant characteristic.

Secured to each side of the bolster 5, as by welding or by being cast integral therewith, and on opposite sides of its central vertical axis is a pair of spaced-apart lever fulcrum ribs or bosses 35 and 36. These lever fulcrum bosses are inclined in opposite directions with respect to the horizontal axis of the bolster 5, as illustratively shown in FIG. 2 of the drawing, and along their longitudinal exposed edge are provided with a wear resistant surface constructed of the same material as the pads 34 and welded thereto.

The respective opposite ends of the bolster 5 each rest on a plurality of truck springs 37 that set on a chord 38 of the truck side frame 9.

As shown in FIG. 1, the release position of the respective brake beams 3 and 4, which is determined by stops 39 (FIG. 2) for the guide feet 7, which stops are carried within guide feet grooves formed in the respective wear plate and guide members 8, is so arranged that there is a slight clearance between the pads 34 and lever fulcrum bosses 35 and 36 to prevent undue wear as the various parts of a railway car travels along a track at high speeds.

OPERATION
(a) Car Empty

While a railway car equipped with the brake rigging of the present invention is empty, the bolster 5 and the lever fulcrum bosses 35 and 36 carried thereby occupy the vertical position with respect to the levers 31 and 32 in which they are shown in FIG. 2 of the drawing.

In operation, when it is desired to effect a brake application, fluid under pressure is admitted simultaneously to the pressure chamber 28 in each of the brake cylinders 12 through the corresponding passageway 29 which is connected, as hereinbefore explained, to the brake controlling valve device of the usual air brake system on railway freight cars. Fluid under pressure thus supplied to the chamber 28 formed between the corresponding packing cup 27 and the closed end or pressure head of each brake cylinder 12 is effective to move the piston 17 to which the respective packing cup 27 is secured and the corresponding brake cylinder 12 in opposite directions. The fluid pressure force thus applied to each piston 17 is transmitted through the push rod 21 and head 22 thereon to the adjacent ends of the corresponding levers 31 and 32.

Since the operation of each brake cylinder 12 and its corresponding brake beam is substantially the same except the brake beams 3 and 4 are moved in opposite directions, a description of the operation of the brake beam 3 and its corresponding brake cylinder 12 is deemed to be sufficient for both.

Accordingly, the force thus applied to the adjacent ends of the levers 31 and 32, pivotally mounted by the pins 33 on the brake beam 3, is effective to rock the levers 31 and 32 in opposite directions about the corresponding pins 33 until the pads 34 carried by the levers 31 and 32 are moved into contact with the respective lever fulcrum bosses 35 and 36, which bosses 35 and 36 now become the fulcrums for the corresponding levers 31 and 32, as is apparent from the drawing.

Upon movement of the levers 31 and 32 into contact with the corresponding lever fulcrum bosses 35 and 36 while the car is empty, each of the levers is thereafter fulcrumed on its corresponding lever fulcrum boss so that it has two arms of equal length, the length of these arms being designated "a" in FIG. 2 of the drawing.

Since the length of the two arms of each of the levers 31 and 32 is the same, the same force that is transmitted by the push rod 21 to one end of each lever is transmitted to the corresponding pin 33 at the opposite end of each lever, since no mechanical advantage is provided when the two arms of the levers are of equal length.

The fluid under pressure supplied to the pressure chamber 28 in the brake cylinder 12 acts on the closed end or pressure head of the brake cylinder over an area equal to the effective area of the packing cup 28 and thereby establishes a force on the pressure head of the brake cylinder that is equal in magnitude to the force transmitted to the push rod 21 by the piston 17 but is opposite in its direction of action. This force established on the pressure head of the brake cylinder 12 is transmitted to the corresponding brake beam 3 through the cap screws 13 which secure the brake cylinder 12 to its corresponding brake beam 3 and acts in a direction to move this brake beam away from the bolster 5 so that the brake shoes carried at the respective opposite ends of the brake beam 3 are moved toward the treads of the corresponding wheels of the car truck. Therefore, the total force for pressing the brake shoes carried by each brake beam against the treads of the corresponding wheels is equal to the sum of the force acting on the pressure head of the brake cylinder 12 carried by the respective brake beam and the two equal forces that are transmitted to the two pins 33 carried by the respective brake beam from the corresponding push rod 21 in the manner explained above.

It is apparent from the foregoing that the fluid under pressure supplied to the pressure chamber 28 in the brake cylinder 12 carried by each brake beam is effective to move these brake beams in opposite directions and away from the bolster 5. Therefore, as the brake beams move in opposite directions, the brake shoes carried by these beams are brought into braking contact with the wheels of the truck to effect a braking action on the wheels.

As the brake beams 3 and 4 are moved as described above, these beams are supported and guided by the guide feet 7, as these feet have sliding contact in the groove in the wear plate and guide members 8. As hereinbefore mentioned, the orientation of the wear plate and guide members 8 is such that the brake beams 3 and 4 and the brake shoes 10 carried thereby are moved radially toward the wheels.

It will be understood that in view of the disposition of the brake cylinder on each brake beam at the center thereof and therefore substantially on the longitudinal axis of the truck and the corresponding symmetrical relation of the points at which the piston rods contact the ends of the levers pivoted on the respective brake beams, the simultaneous supply of fluid at the same pressure to the pressure chambers 28 of both brake cylinders produces substantially equalized forces of application of the brake shoes to the wheels.

When it is desired to release the brake application, the fluid under pressure supplied to chamber 28 of each brake cylinder 12 is vented through the passageway 29, the pipe and flexible hose connected thereto, and the brake controlling valve device of the car brake system to atmosphere, whereupon the force of each spring 24 acting through the corresponding spring seat 25 and hollow rod packing seal 26 on the corresponding boss 14 on the respective brake beam moves the brake cylinder 12 carried thereon and its corresponding piston 17 toward each other until the piston 17 reaches the position in the brake cylinder 12 in which it is shown in FIG. 1.

Due to the inclination of the grooves in the wear plate and guide members 8, the brake beams tend to return by action of gravity to their normal symmetrical relation with respect to the truck bolster, in which position the clearance between the brake shoes on one brake beam and their associated wheels is substantially equal to the clearance between the brake shoes on the other brake beam and their associated wheels.

It will be noted that it is not necessary to use a slack adjuster with this type of rigging. Since there are no links and levers between each of the brake cylinders and the brake beams of the present invention, there can be no wear therein which must be compensated for by a slack adjuster as in conventional brake rigging. It should be understood that the length of the bore in the casing of cylinder 12 is such as to provide sufficient travel for the piston 17 in addition to that required to effect contact of the brake shoes with the wheel treads that, as the brake shoes 10 wear away, the shoes are always properly moved into braking contact with the wheels of the truck during each brake application throughout their useful life without the necessity of a slack adjuster to compensate for wear of the shoes.

(b) Car Fully Loaded

As a railway freight car equipped with the brake rigging of the present invention is loaded with some commodity such as, for example, coal or iron ore, one half of the weight of this load is transmitted from the center sill of the car body to the bolster 5 of the truck at one end of the freight car, and the other half of this weight is likewise transmitted to the bolster 5 of the truck at the other end of the freight car.

Referring to FIG. 2 of the drawing, it will be apparent that as the weight of the load on the bolster 5 is increased, the springs 37 upon which the respective opposite ends of the bolster 5 rest will be deflected downward or compressed so that the bolster 5 and the lever fulcrum bosses 35 and 36 carried thereby are moved downward from the position shown to a position nearer track rails 40 that support the wheels 1 and 2 which, in turn, support the truck side frames 9 and the brake beams 3 and 4 in the usual manner.

While the freight car is fully loaded, the bolster 5 and lever fulcrum bosses 35 and 36 secured thereto, shown in FIG. 2, will occupy a position below the position in which they are shown, in which lower position the levers 31 and 32 carried by the brake beam 3 will occupy a position with respect to the bolster 5 as is indicated by the dot and dash lines shown in FIG 2. Therefore, upon movement of the levers 31 and 32 carried by the respective brake beams into contact with the corresponding lever fulcrum bosses 35 and 36 on the bolster 5 in response to the supply of fluid under pressure to the pressure chambers 28 in the corresponding brake cylinders 12 while the car is fully loaded, each of the levers is thereafter fulcrumed on its corresponding lever fulcrum boss so that it has two arms of unequal length, the length of the longer arm being designated "$b$" and the length of the shorter arm being designated "$c$" in FIG. 2 of the drawing.

It is apparent from the drawing that equal forces are applied to the adjacent ends of the levers 31 and 32 carried by each brake beam by the push rod 21 of the corresponding brake cylinder 12 in response to the supply of fluid under pressure to the pressure chamber 28 thereof in the manner hereinbefore explained in detail. Furthermore, the end of each short arm "$c$" opposite the corresponding lever fulcrum boss is pivotally connected by a pin 33 to a brake beam. Therefore, since the arms "$b$" and "$c$" of each of the levers 31 and 32 are unequal in length the arm "$b$" is longer than the arm "$c$," a mechanical advantage is provided by each of the levers 31 and 32 so that the force applied to each pin 33 by the corresponding lever is greater than the force applied to the opposite end of this lever by the corresponding push rod 21. Because the force applied to each pin 33 while the car is loaded is greater than the force applied to the opposite end of the corresponding lever, it is apparent that a greater total force is exerted on the brake shoes carried by each respective brake beam while the car is loaded than while it is empty, since the total force for pressing the brake shoes carried by each brake beam against the treads of the corresponding wheels is equal to the sum of the force acting on the pressure head of the brake cylinder 12 carried by the respective brake beam, which force is the same regardless of whether the car is loaded or empty, and the two equal forces that are transmitted to the two pins 33 carried by the respective brake beam from the corresponding push rod 21. Consequently, as the brake beams move in opposite directions, the brake shoes carried by these beams are brought into braking contact with the wheels of the truck to effect a braking action on the wheels, which braking action is greater in degree than the braking action exerted on these wheels during a brake application made while the car is empty.

When it is desired to release the brake application on the loaded car, the fluid under pressure supplied to chamber 28 of each brake cylinder 12 is vented to atmosphere in the manner hereinbefore described in connection with the release of the brakes on an empty car, whereupon the force of each spring 24 in the respective brake cylinders 12 is effective to move the corresponding brake cylinder 12 and its piston 17 toward each other.

Due to the inclination of the grooves in the wear plate and guide members 8, the brake beams will be returned by the action of gravity to their normal symmetrical relation with respect to the truck bolster, in which position the clearance between the brake shoes on one brake beam and their associated wheels is substantially equal to the clearance between the brake shoes on the other brake beam and their associated wheels.

Having now described the invention, what I claim as new and desire to secure by Letters Patent, is:

1. In a brake rigging for a railway vehicle truck having a pair of side frames and springs for supporting a bolster on the side frames, the combination of:

(a) a pair of brake beams extending transversely of the truck on the opposite sides respectively of the bolster and movably supported on the truck side frames, said beams carrying brake shoes for braking contact with wheels of the truck, (b) a pair of levers for each of said brake beams, each lever of each pair of levers being pivoted on the corresponding brake beam and the levers of each pair having their adjacent ends disposed in substantial abutting relationship midway the length of the corresponding brake beam, (c) a fulcrum rib for engagement by each of said levers, said fulcrum ribs being carried by the bolster, (d) a pair of brake cylinders each open at one end and closed at the other, each cylinder being rigidly secured at its open end to one of said brake beams at a point midway the ends thereof, (e) a piston slidably operable in each said brake cylinder for cooperation with the closed end thereof to form a pressure chamber to which fluid under pressure may be supplied and from which fluid under pressure may be released, and (f) a piston rod disposed between each piston and the adjacent ends of the pair of levers carried by the corresponding brake beam for transmitting the fluid pressure force on the respective piston to the adjacent ends of said pair of levers to cause rocking of each one of said pair of levers about the corresponding lever fulcrum rib mounted on the bolster to transmit a corresponding force through the pivotal connection of the respective lever to said corresponding brake beam whereby each said corresponding brake beam is moved away from the bolster to effect braking of the wheels by joint action of said corresponding forces.

2. A brake rigging as claimed in claim 1, further characterized in that said spaced-apart fulcrum ribs are respectively inclined in opposite directions at an acute angle to the horizontal axis of the bolster.

3. A brake rigging as claimed in claim 1, further characterized in that said spaced-apart fulcrum ribs on the bolster are inclined in opposite directions at an acute angle to the horizontal axis of the bolster whereby each corresponding lever carried by the brake beam on the same side of the bolster engages the corresponding fulcrum rib at different points along the rib accordingly as the load carried by the bolster varies the sprung height of the bolster relative to the beams.

4. A brake rigging as claimed in claim 1, further characterized in that said spaced-apart lever fulcrum ribs on the bolster are inclined in opposite directions at an acute angle to the horizontal axis of the bolster whereby each corresponding lever carried by the brake beam on the same side of the bolster is divided into two arms, that one of which is adjacent the other lever pivoted on said brake beam increasing in length directly as the load carried by the bolster increases whereby the mechanical advantage provided by said levers for transmittal of the force to said brake beam increases as the load on the bolster increases.

5. A brake rigging as claimed in claim 1, further characterized in that said spaced-apart lever fulcrum ribs on the bolster are inclined in opposite directions at an acute angle to the horizontal axis of the bolster whereby each corresponding lever carried by the brake beam on the same side of the bolster is divided into two arms, that one arm of which is adjacent the other lever pivoted on said brake beam respectively increasing in length and that other arm of which is pivoted on said brake beam respectively decreasing in length to thereby insure that the force transmitted to said brake beam increases as the load on the bolster increases.

6. A brake rigging for a multi-wheel type of railway vehicle truck having a pair of side frames with a longitudinal axis and a transverse axis and springs for supporting a truck bolster on the side frames, said rigging comprising:

(a) two brake shoe carrying brake beams extending transversely of the truck on the opposite sides respectively of the bolster and movably supported on the side frames of the truck in substantial parallel relation to each other for movement into braking contact with wheels of the truck, (b) a brake cylinder carried by each of said brake beams, each brake cylinder containing slidably disposed therein a piston having a piston rod, (c) a pair of levers for each of said brake beams, each lever being pivotally connected at one end to its respective brake beam and having its other end disposed in the path of movement of the piston rod of the brake cylinder carried by said respective brake beam, and (d) a pair of oppositely arranged and inclined fulcrum ribs mounted on each side of the bolster, each fulcrum rib being disposed opposite one lever of the pair of levers on the brake beam on the same side of the spring supported bolster, each of said fulcrum ribs being effective to divide the corresponding one lever into two arms, the length of that arm which is adjacent the other one of the pair of levers pivoted on said brake beam increasing in length directly as an increase in the load carried by the spring supported bolster moves the bolster in the direction to increase the deflection of the springs supporting the bolster thereby increasing the mechanical advantage provided by each respective lever as the load on the bolster increases whereby said brake beams are moved in opposite directions by forces variable according to the load on the bolster in response to the simultaneous supply of fluid under pressure to the brake cylinder carried on each brake beam effecting rocking of each lever about its respective lever fulcrum as the fluid under pressure moves each brake cylinder and its corresponding piston in opposite directions.

7. A brake rigging for a multi-wheel type of railway vehicle truck having a pair of side frames with a longitudinal axis and a transverse axis and springs for supporting a truck bolster on the side frames, said rigging comprising:

(a) two brake shoe carrying brake beams extending transversely of the truck on the opposite sides respectively of the bolster and movably supported on the side frames of the truck in substantial parallel relation to each other for movement into braking contact with wheels of the truck, (b) a brake cylinder carried by each of said brake beams, each brake cylinder containing slidably disposed therein a piston having a piston rod, (c) a pair of levers for each of said brake beams, each lever being pivotally mounted at one end on its corresponding brake beam and having its opposite end disposed in the path of movement of the corresponding piston rod, (d) a shiftable fulcrum rib for contact by each of said levers carried by the bolster and shiftable with respect to its corresponding lever in accordance with a change in load on the spring supported bolster to increase the mechanical advantage provided by each respective lever as the load on the bolster increases whereby the total force for moving the two brake shoe carrying brake beams in opposite directions away from the bolster is correspondingly increased as the load on the bolster increases.

8. A brake rigging for a multi-wheel type of railway vehicle truck having a pair of side frames with a longitudinal axis and a transverse axis and springs for supporting a truck bolster on the side frames, said rigging comprising:

(a) two brake shoe carrying brake beams extending transversely of the truck on the opposite sides respectively of the bolster and movably supported on the side frames of the truck in substantial parallel relation to each other for movement into braking contact with the wheels of the truck, (b) a brake cylinder carried by each of said brake beams, each brake cylinder containing slidably disposed therein a piston having a piston rod, (c) a pair of levers for each of said brake beams, each lever being pivotally connected at one end to its corresponding brake beam and having its opposite end disposed in the path of movement of the corresponding piston rod for transmitting force from said piston rod to said corresponding brake beam, and (d) a shiftable fulcrum rib for contact by each of said levers, each fulcrum rib being carried by the bolster and shifted to increase or decrease the mechanical advantage of its corresponding lever accordingly as the load on the bolster is correspondingly increased or decreased to thereby vary the force transmitted by the respective piston rod through the corresponding pair of levers to said corresponding brake beam upon which said corresponding levers are pivotally mounted in response to the supply of fluid under pressure to the brake cylinder carried by said brake beam.

9. A brake rigging as claimed in claim 8, further characterized in that said brake beams are of cast construction and have a boss integral therewith midway the ends thereof to which the corresponding brake cylinder may be removably secured.

10. A brake rigging as claimed in claim 8, further characterized in that said fulcrum members are cast integral with the truck bolster and shiftable therewith in response to an increase in the load thereon deflecting the springs supporting the bolster.

11. In a brake rigging for a railway vehicle truck having a pair of side frames, the combination of:

(a) a transversely extending brake shoe carrying brake beam supported at each end by one of the frames of the truck for movement into braking contact with wheels of the truck, (b) a brake cylinder rigidly secured to said brake beam midway the ends thereof and having a piston slidably operable therein, (c) a pair of levers each pivotally mounted at one end on said brake beam and having its opposite end disposed in substantial abutting relationship with that of the other substantially midway the ends of said brake beam, (d) a spring supported truck bolster, (e) a pair of oppositely arranged and inclined fulcrum ribs mounted on one side of said truck bolster, each fulcrum rib being disposed opposite one of said levers pivoted on said brake beam so as to divide the corresponding lever into two arms and inclined in a direction opposite that of the other to insure that the length of that arm which is adjacent the other lever increases in length directly as an increase in the load carried by said spring supported bolster moves said bolster carried fulcrum ribs relative to said levers, (f) a piston rod connected to the piston of said brake cylinder, and (g) a disc-like member connected to the free end of said piston rod for abutting contact with the adjacent ends of said levers whereby fluid under pressure supplied to said brake cylinder establishes equal and opposite forces respectively on said brake cylinder and its corresponding piston, the force established on said piston being transmitted via said piston rod to the adjacent ends of said levers for respectively rocking said levers in opposite directions about their corresponding lever fulcrums to apply two equal forces to said brake beam on opposite sides of and equidistant from the center of said brake beam to assist the fluid pressure force established on said brake cylinder to move said brake beam in a direction away from said spring supported bolster with a total force that increases as the load on said spring supported bolster increases.

12. In a brake rigging for a railway vehicle truck, the combination of:

(a) two parallel spaced-apart truck side frames each having a chord, (b) a spring supported on the chord of each of said side frames, (c) a truck bolster carried by said springs and movable toward the chords of said side frames in accordance with an increase in the load thereon, (d) a brake beam extending transversely of the truck and carrying brake shoes for braking contact with wheels of the truck, said brake beam being slidably supported at each end by one of said truck side frames, (e) a pair of levers each pivotally mounted at one end on said brake beam and having its opposite end disposed in substantial abutting relationship with that of the other midway the ends of said brake beam, (f) a brake cylinder rigidly secured to said brake beam midway the ends thereof, (g) a pair of oppositely inclined fulcrum ribs mounted on said bolster, and (h) a piston slidably operable in said brake cylinder and having a piston rod operatively connected at one end to said piston, the opposite end being disposed in contact with the adjacent ends of said levers, said brake cylinder having a pressure chamber formed between one end thereof and said piston to which fluid under pressure may be supplied to move said brake cylinder and said piston in opposite directions in response to equal and opposite fluid pressure forces established thereon, the force thus established on said piston being transmitted via said piston rod to the adjacent ends of said levers for rocking each lever in a direction opposite that of the other about one of said fulcrum ribs to apply two equal forces to said brake beam on opposite sides of and equidistant from the center of said brake beam to assist the fluid pressure force established on said brake cylinder in moving said brake beam away from said bolster.

13. In a brake rigging for a railway vehicle truck having a pair of side frames and springs for supporting a bolster on the side frames, the combination of:

(a) a pair of brake beams extending transversely of the truck on the opposite sides respectively of the bolster and movably supported on the truck side frames, said beams carrying the brake shoes for braking contact with wheels of the truck, (b) a lever for each of said brake beams, each lever being pivoted on the corresponding brake beam, (c) a fulcrum rib for each of said levers engageable thereby, each said fulcrum rib being carried by the bolster, (d) a pair of brake cylinders each open at one end and closed at the other, each cylinder being rigidly secured at its open end to one of said brake beams, (e) a piston slidably operable in each said brake cylinder for cooperation with the closed end thereof to form a pressure chamber to which fluid under pressure may be supplied and from which fluid under pressure may be released, and (f) a piston rod disposed between each piston and the free end of the lever carried by the corresponding brake beam for transmitting the fluid pressure force on the respective piston to said free end of the lever to cause rocking of each respective one of said levers about the corresponding lever fulcrum rib mounted on the bolster to transmit a corresponding force through the pivotal connection of the respective lever to said corresponding brake beam whereby each said corresponding brake beam is moved away from the bolster to effect braking of the wheels by the action of said corresponding forces.

14. A brake rigging as claimed in claim 13, further characterized in that the fulcrum ribs on the bolster are inclined at an acute angle to the horizontal axis of the bolster such that the corresponding lever carried by a brake beam is divided into two arms the respective lengths of which vary inversely as the load on the bolster varies so as to produce an increase in the mechanical advantage provided by each said lever for transmittal of force to the corresponding brake beam as the load on the bolster increases, and vice versa.

References Cited in the file of this patent

UNITED STATES PATENTS

| | | |
|---|---|---|
| 2,001,327 | Johnson | May 14, 1935 |
| 2,885,034 | Holin | May 5, 1959 |
| 2,966,963 | Williams | Jan. 3, 1961 |